US012804519B2

(12) United States Patent
Shi et al.

(10) Patent No.: US 12,804,519 B2
(45) Date of Patent: Nov. 17, 2026

(54) INFORMATION PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventors: Rao Shi, Beijing (CN); Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 270 days.

(21) Appl. No.: 18/715,411

(22) PCT Filed: Dec. 3, 2021

(86) PCT No.: PCT/CN2021/135531
§ 371 (c)(1),
(2) Date: May 31, 2024

(87) PCT Pub. No.: WO2023/097695
PCT Pub. Date: Jun. 8, 2023

(65) Prior Publication Data
US 2025/0024352 A1 Jan. 16, 2025

(51) Int. Cl.
*H04W 48/10* (2009.01)
*H04W 68/02* (2009.01)

(52) U.S. Cl.
CPC ......... *H04W 48/10* (2013.01); *H04W 68/025* (2013.01)

(58) Field of Classification Search
CPC ..... H04W 48/10; H04W 68/025; H04W 8/26; H04W 48/12; H04W 8/186; H04W 68/00; H04W 72/23
See application file for complete search history.

(56) References Cited

U.S. PATENT DOCUMENTS

| | | | | |
|---|---|---|---|---|
| 12,588,002 B2 * | 3/2026 | Dong | .................... | H04W 68/02 |
| 2023/0379874 A1 * | 11/2023 | He | ........................ | H04W 76/30 |
| 2024/0236939 A9 * | 7/2024 | Agiwal | ................. | H04W 68/02 |
| 2024/0284403 A1 * | 8/2024 | Agiwal | ................. | H04W 68/02 |

FOREIGN PATENT DOCUMENTS

| | | | | |
|---|---|---|---|---|
| CN | 102647666 A | 8/2012 | | |
| WO | WO-2025161902 A1 * | 8/2025 | ............ | H04W 52/28 |

OTHER PUBLICATIONS

"Discussion on paging subgrouping support n UE and network", Huawei, HiSilicon, 3GPP TSG-RAN WG2 Meeting #115 electronic, R2-2108028, Online, Aug. 9-27, 2021, 4 pages.

(Continued)

*Primary Examiner* — Vladimir Magloire
(74) *Attorney, Agent, or Firm* — Finnegan, Henderson, Farabow, Garrett & Dunner, L.L.P.

(57) ABSTRACT

A method for processing information is performed by a base station, and includes: in case that the base station supports a first subgroup ID of a radio access network (RAN), broadcasting paging sub-grouping configuration information, wherein the paging sub-grouping configuration information is configured for a user equipment (UE) to determine the first subgroup ID.

20 Claims, 5 Drawing Sheets

(56) References Cited

OTHER PUBLICATIONS

"Summary of [Post115-e][089][ePowSav] Paging Subgrouping", Xiaomi Communications (email discussion rapporteur), 3GPP TSG-RAN WG2 Meeting #116 electronic, R2-2109647, Online, Nov. 1-12, 2021, 45 pages.

"CN assigned paging subgroups", Ericsson, it3GPP TSG-RAN2 Meeting #116-e, R2-2110413, eMeeting, Nov. 1-12, 2021, 9 pages.

"UE Paging Subgroup Assignment", MediaTek Inc., 3GPP TSG-RAN WG2 Meeting #116 electronic, R2-2110967, Online, Nov. 1-12, 2021, 5 pages.

Extended European Search Report Issued in Application No. 21966121.2 dated Jan. 17, 2025, 12 pages.

Notice of Reasons for Refusal issued by the Japanese Patent Office on Apr. 2, 2025, in corresponding Application No. JP 2024-532696, 11 pages.

"On supporting both CN-assigned subgrouping and UEID-based subgrouping in a same cell", Futurewei, 3GPP TSG-RAN WG2 Meeting #116-e, R2-21100792, Electronic Meeting, Nov. 1-12, 2021, 6 pages.

"Further discussion on paging subgrouping", Huawei, HiSilicon, 3GPP TSG-RAN WG2 Meeting #115 electronic, R2-2108027, Online, Aug. 9-27, 2021, 10 pages.

"Paging Monitoring with UE Subgrouping", MediaTek Inc., 3GPP TSG-RAN WG2 Meeting #116 electronic, R2-2110968, Online, Nov. 1-12, 2021, 6 pages.

International Search Report and Written Opinion of International Application No. PCT/CN2021/135531, dated Aug. 31, 2022, 14 pages.

* cited by examiner

INFORMATION PROCESSING METHOD AND APPARATUS, COMMUNICATION DEVICE, AND STORAGE MEDIUM

CROSS-REFERENCE TO RELATED APPLICATION

This application is the U.S. National Stage Application of International Application No. PCT/CN2021/135531, filed on Dec. 3, 2021, the entire content of which is incorporated herein by reference.

TECHNICAL FIELD

The present disclosure relates to but is not limited to the field of wireless communication technology, particularly to a method and an apparatus for processing information, a communication device, a storage medium.

BACKGROUND

For an IDLE/INACTIVE state, the network pages a user equipment (UE) via a paging mechanism. When the network needs to send downlink data or signaling, the UE is asked to initiate a radio resource control (RRC) connection setup or connection recovery process by sending a paging message, so that the UE returns to a RRC connected state again. In addition, the paging mechanism may also be used to notify, by sending paging short messages, all UEs in the RRC state within the network coverage to receive system message updates, as well as notify warning information in the earthquake and tsunami warning system (ETWS) and the commercial mobile alert system (CMAS).

In the current paging mechanism, the UE calculates a paging occasion (PO) to be monitored by reading paging configuration in a system information block (SIB1) and combining a paging calculation formula agreed in a protocol and an assigned UE-ID. The UE will then monitor the PO in each paging period. It is worth noting that the UE-ID is obtained by a UE identification code (5G-S-TMSI, SAE Temporary Mobile Subscriber identification) mod 1024, which means that different UEs can have the same UE-ID. Then such UEs may also be assigned to a same paging group and monitor a same PO.

SUMMARY

In a first aspect, an embodiment of the present disclosure provides a method for processing information. The method is performed by a base station. The method includes:

- in case that the base station supports a first subgroup ID of a radio access network (RAN), broadcasting paging sub-grouping configuration information, in which the paging sub-grouping configuration information is configured for a user equipment (UE) to determine the first subgroup ID.

In a second aspect, an embodiment of the present disclosure provides a method for processing information. The method is performed by a UE. The method includes:

- receiving paging sub-grouping configuration information sent by a base station in case that the base station supports a first subgroup ID of a RAN, in which the paging sub-grouping configuration information is configured for the UE to determine the first subgroup ID.

In a third aspect, an embodiment of the present disclosure provides a communication device, which includes a processor, a transceiver, a memory and an executable program stored in the memory and capable of being run by the processor. The processor is configured to: in case that the base station supports a first subgroup ID of a RAN, broadcast paging sub-grouping configuration information, in which the paging sub-grouping configuration information is configured for a UE to determine the first subgroup ID.

BRIEF DESCRIPTION OF THE DRAWINGS

The accompanying drawings, which are incorporated in and constitute a part of this specification, illustrate embodiments consistent with the present disclosure and, together with the description, serve to explain the principles of the embodiments of the present disclosure.

DETAILED DESCRIPTION

Example embodiments are described in detail here, examples of which are illustrated in the accompanying drawings. When the following description refers to the drawings, unless otherwise indicated, the same numbers in different drawings represent the same or similar elements. The implementations described in the following example embodiments do not represent all implementations consistent with the embodiments of the present disclosure. Rather, they are merely examples of apparatus and methods consistent with some aspects of embodiments of the present disclosure as recited in the appended claims.

The terms used in the embodiments of the present disclosure are only for the purpose of describing specific embodiments and are not intended to limit the embodiments of the present disclosure. As used in the present disclosure and the appended claims, the singular forms "a," "an," and "the" are intended to include the plural forms as well, unless the context clearly indicates otherwise. It should also be understood that the term "and/or" used herein refers to and encompasses any and all possible combinations of one or more of the associated listed items.

It should be understood that although the terms first, second, third, etc. may be used to describe various information in the embodiments of the present disclosure, the information should not be limited to these terms. These terms are used only to distinguish information of the same type from one another. For example, without departing from the scope of the embodiments of the present disclosure, first information may also be referred to as second information, and similarly, second information may also be referred to as first information. The word "if" as used herein may be interpreted as "when" or "in case that" or "in response to determining," depending on the context.

According to the technical solution in the embodiment of the present disclosure, the base station broadcasts the paging sub-grouping configuration information when supporting the first subgroup ID of the RAN. Thus, when the UE receives the paging sub-grouping configuration information, the UE may consider that the base station supports the first subgroup ID of the RAN. When the UE does not receive the paging sub-grouping configuration information, the UE may consider that the base station does not support the first subgroup ID of the RAN. As such, compared with specially broadcasting indication information of whether the base station supports the first subgroup ID of the RAN, the method has a feature of low signaling overhead.

Figure 1:
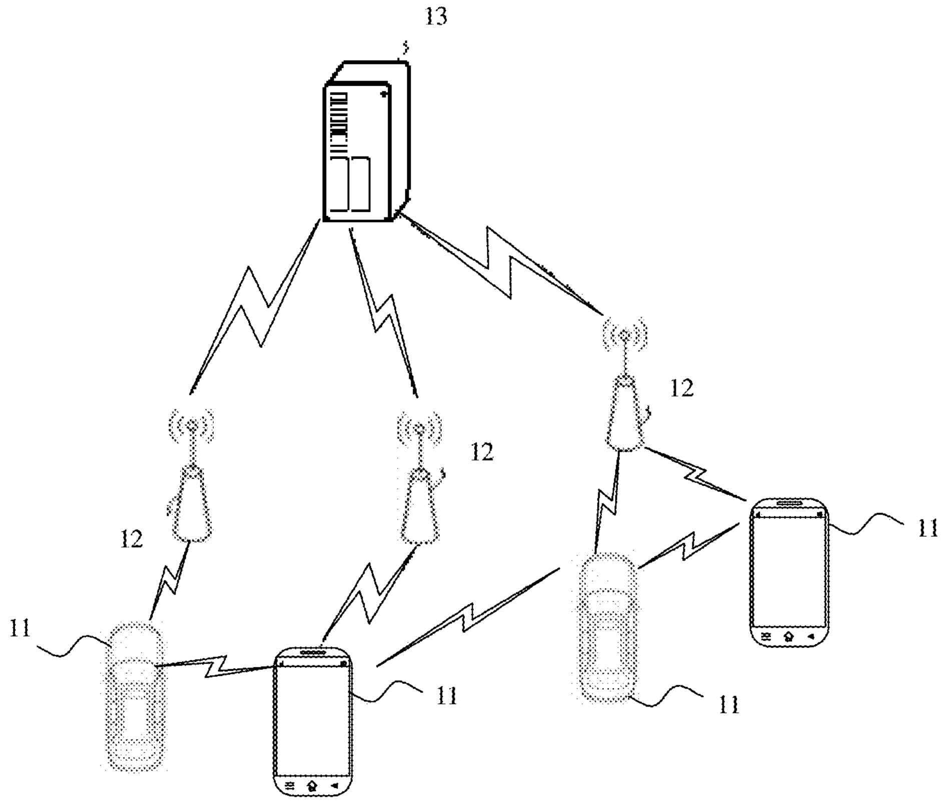
FIG. 1 is a structure diagram illustrating a wireless communication system according to an example embodiment.

Referring to FIG. 1, it is a structure diagram illustrating a wireless communication system according to an embodiment of the present disclosure. As shown in FIG. 1, the wireless communication system is a communication system based on cellular mobile communication technology. The wireless communication system may include several UEs 11 and several access devices 12.

The UE 11 may refer to a device that provides voice and/or data connectivity to a user. The UE 11 may communicate with one or more core networks via a RAN. The UE 11 may be an Internet of Things (IoT) UE, such as a sensor device, a mobile phone (or a "cellular" phone), and a computer with an IoT UE, for example, a fixed, portable, pocket-sized, handheld, computer-built-in, or vehicle-mounted device. For example, The UE 11 is a station (STA), a subscriber unit, a subscriber station, a mobile station, a mobile, a remote station, an access point, a remote terminal, an access terminal, a user terminal, a user agent, a user device, or a user equipment (UE). Alternatively, the UE 11 may also be a device of an unmanned aerial vehicle. Alternatively, the UE 11 may also be a vehicle-mounted device, for example, a driving computer with a wireless communication function, or a wireless communication device externally connected to the driving computer. Alternatively, the UE 11 may also be a roadside device, for example, a street light, a signal light or other roadside device with a wireless communication function.

The access device 12 may be a network-side device in a wireless communication system. The wireless communication system may be a fourth generation mobile communication (4G) system, also known as a long term evolution (LTE) system. Alternatively, the wireless communication system may be a 5G system, also known as a new radio (NR) system or a 5G NR system. Alternatively, the wireless communication system may also be a next generation system of the 5G system. The access network in the 5G system may be called new generation-radio access network (NG-RAN). Alternatively, the wireless communication system may also be machine type communication (MTC) system.

The access device 12 may be an evolved access device (eNB) used in a 4G system. Alternatively, the access device 12 may also be an access device (gNB) that adopts a centralized distributed architecture in a 5G system. When the access device 12 adopts a centralized distributed architecture, a centralized unit (CU) and at least two distributed units (DU) are usually included. The CU is provided with protocol stacks of a packet data convergence protocol (PDCP) layer, a radio link control (RLC) layer, and a media access control (MAC) layer. The DU is provided with a protocol stack of a physical (PHY) layer. The embodiment of the present disclosure does not limit a specific implementation of the access device 12.

A wireless connection may be established between the access device 12 and the UE 11 via a radio interface. In different implementations, the radio interface is one based on the 4G standard. Alternatively, the radio interface is one based on the 5G standard, for example, a NR interface. Alternatively, the radio interface may also be one based on a next generation mobile communication network technology standard of 5G.

In some embodiments, an end to end (E2E) connection may also be established between the UE 11, for example, a vehicle to vehicle (V2V) communication, a vehicle to infrastructure (V2I) communication, and a vehicle to pedestrian (V2P) communication in a vehicle to everything (V2X) communication.

In some embodiments, the wireless communication system may further include a network management device 13.

The several access devices 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network device, such as a serving gateway (SGW), a public data network gateway (PGW), a policy and charging rules function (PCRF), or a home subscriber server (HSS). The embodiment of the present disclosure does not limit a implementation of the network management device 13.

Figure 2:
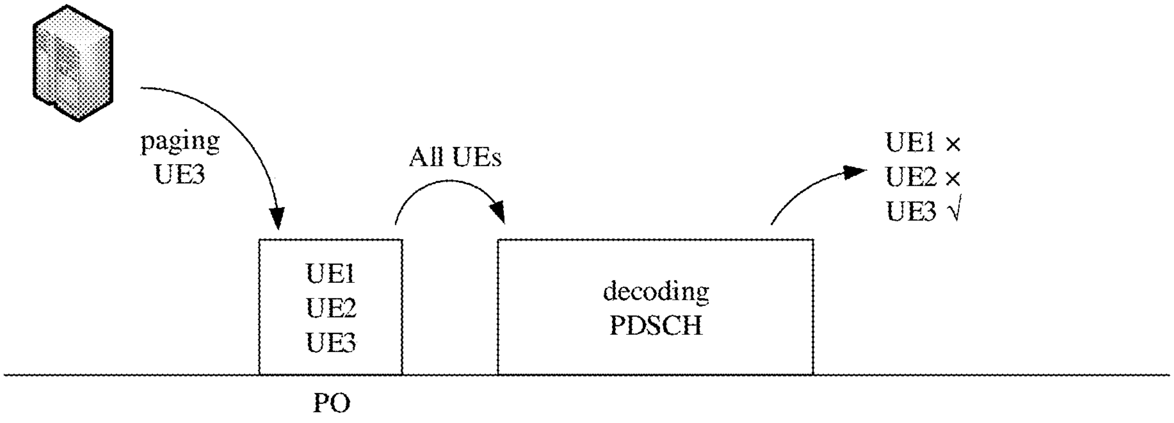
FIG. 2 is a paging-related diagram according to an example embodiment.

As shown in FIG. 2, when the network needs to page a UE3, it sends paging downlink control information (DCI) at the PO monitored by the UE3. At this time, all the UEs within the PO will receive the paging DCI, and the paging DCI will instruct them to receive a paging message on a corresponding downlink data channel (PDSCH). Each of the UEs confirms whether the paging message is sent to itself by matching its own ID.

When ID of UE3 matches correctly, UE3 accesses the network. When IDs of UE1 and UE2 do not match correctly, no response is made, UE1 and UE2 remain in an idle state or an inactive state. It can be seen that the paging mechanism may cause unnecessary paging monitoring of the UE, which will increase power consumption.

For this purpose, a paging sub-grouping mechanism is introduced to optimize the unnecessary paging monitoring. By dividing all UEs within the same PO into several subgroups, the UE only needs to monitor a subgroup corresponding to the UE itself and is not affected by paging messages for other subgroups, thereby achieving the purpose of reducing the unnecessary paging monitoring.

Figure 3:
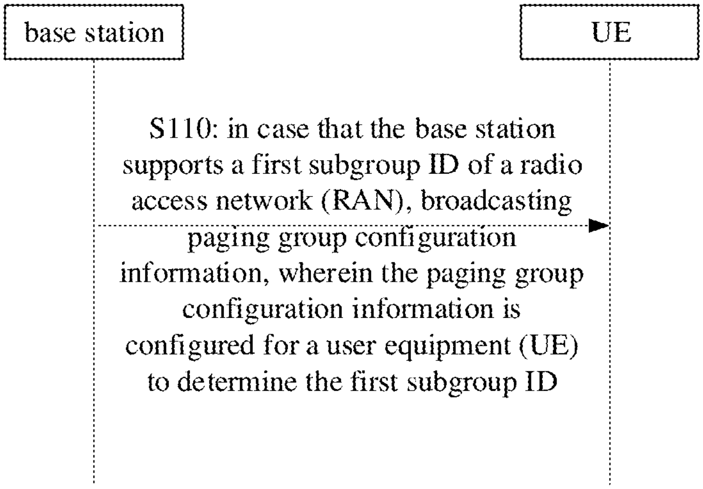
FIG. 3 is a flowchart illustrating a method for processing information according to an example embodiment.

As shown in FIG. 3, an embodiment of the present disclosure provides an method for processing information, which is executed by a base station. The method includes the following step.

At S110, in case that the base station supports a first subgroup ID of a RAN, paging sub-grouping configuration information is broadcasted. The paging sub-grouping configuration information is configured for a UE to determine the first subgroup ID.

The method for processing information is executed by a base station, which may include an eNB or a gNB.

The base station supports the first subgroup ID of the RAN, which means that when the RAN pages a UE in a non-connected state, it may page the UE on a subgroup of a RAN paging group. The first subgroup ID is a subgroup identifier of the RAN paging group. The non-connected state includes an idle state and/or an inactive state.

In the embodiment of the disclosure, the base station broadcasts the paging sub-grouping configuration information only when the base station supports the first subgroup ID. When the base station does not support the first subgroup ID, it may not broadcast the paging sub-grouping configuration information. This is equivalent to implicitly indicating, to the UE, whether the base station supports the first subgroup ID.

The paging sub-grouping configuration information may be carried in a system information block (SIB). For example, the paging sub-grouping configuration information may be included in SIB1, but is not limited to SIB1. For example, the paging sub-grouping configuration information may also be carried in SIB2. In short, the paging sub-grouping configuration information may also be carried in SIBx, where the value of x may be any positive integer. For example, one SIB is configured to carry the paging sub-grouping configuration information.

In some embodiments, the method further includes: in case that the base station does not support the first subgroup ID, the paging sub-grouping configuration information is not broadcast.

In some situations, when the base station does not support the first subgroup ID, the base station does not broadcast the paging sub-grouping configuration information, that is, the base station skips the step of broadcasting the paging sub-grouping configuration information, or the paging sub-grouping configuration information is not broadcast. In this way, the UE cannot receive the paging sub-grouping configuration information, and can know that the base station currently does not support the first subgroup ID, that is, does not support subgroup paging of the RAN paging group.

In some embodiments, the paging sub-grouping configuration information includes: a value range of the first subgroup ID, or a sub-grouping number for the first subgroup ID and an offset value for the first subgroup ID, or an offset value, in which the offset value is determined according to a sub-grouping number for a second subgroup ID from a CN.

A total number of subgroups supported by the base station may be fixed, that is, a sum of the first subgroup ID and the second subgroup ID supported by the base station is fixed/determined.

For example, the value range of the first subgroup ID may be used to determine a parameter of the first subgroup ID itself. When the paging sub-grouping configuration information includes the value range of the first subgroup ID, it is equivalent to implicitly indicating to the UE that the base station supports the first subgroup ID.

The value range of the first subgroup ID may be used to determine a sub-grouping number for the first subgroup ID, and the sub-grouping number may be used to determine the first subgroup ID of the UE.

In an embodiment, the paging sub-grouping configuration information directly includes a sub-grouping number and an offset value for the first subgroup ID. When the paging sub-grouping configuration information simultaneously broadcasts the sub-grouping number and the offset value for the first subgroup ID, it implicitly indicates that the base station supports the first subgroup ID, and it also indicates the sub-grouping number for the first subgroup ID configured by the base station. The value range of the first subgroup ID may be determined by the offset value.

In another embodiment, when the paging sub-grouping configuration information only indicates the offset value but does not indicate the sub-grouping number for the first subgroup ID supported by the base station, it may be considered that the sub-grouping number for the first subgroup ID may be equal to the sum of the sub-grouping number for the first subgroup ID and the sub-grouping number for the second subgroup ID supported by the base station. The sum of the sub-grouping number for the first subgroup ID and the sub-grouping number for the second subgroup ID may be explicitly or implicitly indicated by any information other than the paging sub-grouping configuration information. For example, the sum of the sub-grouping number for the first subgroup ID and the sub-grouping number for the second subgroup ID is implicitly indicated by a number of bits included in the PEI.

The offset value is determined according to a sub-grouping number for the second subgroup ID from the CN. For example, when the sub-grouping number for the second subgroup ID is X, the offset value may be greater than or equal to X and less than or equal to Z, where Z may be the sum of the sub-grouping number for the first subgroup ID and the second subgroup ID supported by the base station.

In an embodiment, whether the base station supports the second subgroup ID may be explicitly indicated by a dedicated bit or may be implicitly indicated.

The following provides a method for implicitly indicating whether the base station supports the second ID:

In some embodiments, when the base station does not support the second subgroup ID, the offset value is an extreme value of the sum of the sub-grouping number for the first subgroup ID and the sub-grouping number for the second subgroup ID. The extreme value may be a maximum value or a minimum value. For example, the sum of the sub-grouping number for the first subgroup ID and the sub-grouping number for the second subgroup ID is determined by 8 values of 3 bits. At this time, the minimum sum of the sub-grouping number for the first subgroup ID and the sub-grouping number for the second subgroup ID supported by the base station may be 0. That is, when the offset value is the minimum value 0, it means that the base station has not reserved a sub-grouping number for the second subgroup ID. The maximum sum of the sub-grouping number for the first subgroup ID and the sub-grouping number for the second subgroup ID supported by the base station may be a maximum value of 8 that may be indicated by the 3 bits, that is, the maximum value is 8.

and/or when the base station supports the second subgroup ID, the offset value is not the extreme value of the sum of the sub-grouping number for the first subgroup ID and the sub-grouping number for the second subgroup ID; when the base station supports the second subgroup ID, it means that at least one of the sum of the sub-grouping number for the first subgroup ID and the sub-grouping number for the second subgroup ID supported by the base station is allocated to the second subgroup ID; at this time the offset value is not the aforementioned maximum value or minimum value; and/or when the base station does not support the second subgroup ID, the sub-grouping number of the first subgroup ID is equal to the sum of the sub-grouping number for the first subgroup ID and the sub-grouping number for the second subgroup ID; when the base station implicitly indicates whether the base station supports the second subgroup ID through the sub-grouping number of the first subgroup ID, for example, the sub-grouping number of the first subgroup ID supported by the base station is equal to the sum of the sub-grouping number for the first subgroup ID and the sub-grouping number for the second subgroup ID supported by the base station, it means that the base station does not support the second subgroup ID at this time; and/or when the base station supports the second subgroup ID, the sub-grouping number of the first subgroup ID is less than the sum of the sub-grouping number for the first subgroup ID and the sub-grouping number for the second subgroup ID. When the sub-grouping number of the first subgroup indicated by the base station through the paging sub-grouping configuration information is less than the sum of the sub-grouping number for the first subgroup ID and the sub-grouping number for the second subgroup ID supported by the base station, it means that at least one subgroup ID may be configured as the second subgroup ID, which also implicitly indicates to the UE that the base station supports the second subgroup ID.

In some embodiments, the paging sub-grouping configuration information further includes: an indication bit, indicating whether the base station supports the second subgroup ID from the CN.

The paging sub-grouping configuration information may include a bit specifically indicating whether the base station supports the second subgroup ID from the CN. For example, the indication bit may include one or more bits. When the indication bit may be 1 bit, the two bit values of the 1 bit may be respectively used to indicate whether the base station supports the second subgroup ID.

In an embodiment, the S110 may include: in case that the base station supports the second subgroup ID from the CN and the first subgroup ID of the RAN, broadcasting the paging sub-grouping configuration information.

In some embodiments, when the CN supports the second subgroup ID, it may be considered that the base station will also support the subgroup ID accordingly. At this time, the base station may also support the first subgroup ID. Therefore, when the base station broadcasts the paging sub-grouping configuration information, it may be considered that the UE supports both the first subgroup ID and the second subgroup ID.

Figure 4:
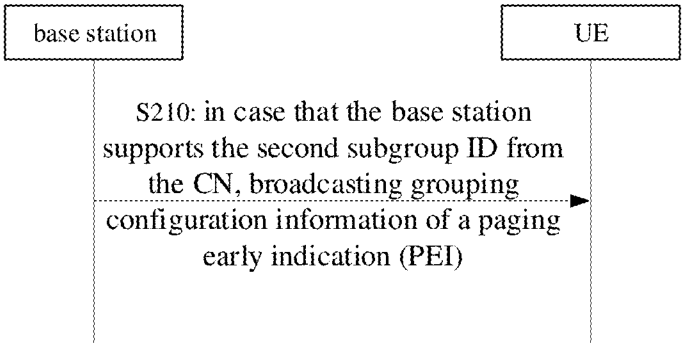
FIG. 4 is a flowchart illustrating a method for processing information according to an example embodiment.

As shown in FIG. 4, the present disclosure provides an method for processing information. The method includes the following step.

At S210, in case that the base station supports the second subgroup ID from the CN, sub-grouping configuration information of the PEI is broadcast.

The sub-grouping configuration information of PEI broadcast indicates that paging subgroups for monitoring a PO are further grouped, which is equivalent to the base station supporting the second subgroup ID.

The PEI indicated by the sub-grouping configuration information of PEI will be further grouped and configured.

After the UE receives the sub-grouping configuration information of PEI, UE determines that the base station supports the second subgroup ID, and UE will monitor the PEI according to its own second subgroup ID. After monitoring the PEI, UE will monitor the PO corresponding to the second subgroup ID, and monitor and decode PDSCH transmission based on a monitoring result of the PO.

In some embodiments, the method further comprises: in response to receiving the second subgroup ID from the CN, the PEI is sent according to the second subgroup ID.

When the base station receives the second subgroup ID from the CN and the base station supports the second subgroup ID, it may send the PEI according to the second subgroup ID, so as to send the PEI by a subgroup of the paging group (the subgroup of the paging group is also called a paging sub-grouping), which awakes UEs within the paging sub-grouping identified by the second subgroup ID to monitor the PO. The further awakened UE listens to/monitors the PO. When the current base station only indicates a system short message, the UE will not further monitor the PDSCH transmission according to the monitoring result of the PO. When the current base station needs to page a specific UE to transmit service data, the UE being paged in the PO will further monitor the PDSCH transmission, which reduces wake-up of UEs that are unnecessarily monitoring the PO.

In some situations, a priority of the second subgroup ID may be higher than a priority of the first subgroup ID. In this way, when the second subgroup ID is received from the CN, even if the base station supports the first subgroup ID and the current base station is a paged UE in an inactive state, the base station will send the PEI according to the second subgroup ID.

Figure 5:
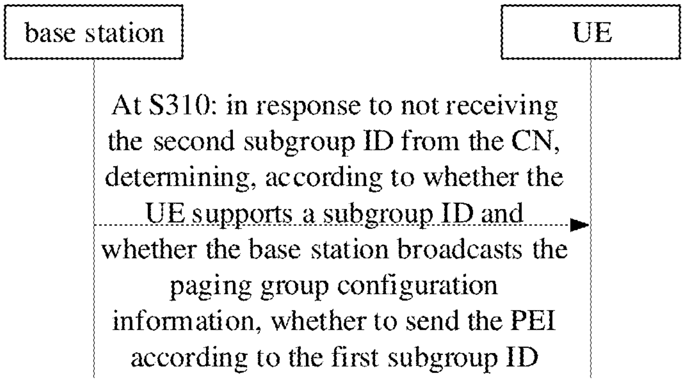
FIG. 5 is a flowchart illustrating a method for processing information according to an example embodiment.

As shown in FIG. 5, the present disclosure provides an method for processing information. The method further includes the following step.

At S310, in response to not receiving the second subgroup ID from the CN, whether to send the PEI according to the first subgroup ID is determined according to whether the UE supports a subgroup ID and whether the base station broadcasts the paging sub-sub-grouping configuration information.

In some embodiments, when the base station does not receive the second subgroup ID from the CN, it means that the CN does not require the base station to page a UE according to a paging sub-grouping. At this time, whether the base station supports paging the UE with a sub-grouping may be further determined based on whether the UE supports the first subgroup ID and whether the base station broadcasts the paging sub-grouping configuration information. Then, whether to send the PEI according to the first subgroup ID is determined.

For example, determining, according to whether the UE supports the subgroup ID and whether the base station broadcasts the paging sub-grouping configuration information, whether to send the PEI according to the first subgroup ID includes:

in case that the UE supports the first subgroup ID and the base station broadcasts the paging sub-grouping configuration information, sending the PEI according to the first subgroup ID; or in case that the UE does not support the first subgroup ID, not sending the PEI according to the first subgroup ID; or in case that the base station does not broadcast the paging sub-grouping configuration information, not sending the PEI according to the first subgroup ID.

When the UE supports the first subgroup ID and the base station broadcasts the paging sub-grouping configuration information, it means that both the UE and the base station support the first subgroup ID. At this time, in order to reduce the power consumption of the UE, the PEI may be broadcast according to the first subgroup ID.

When the UE does not support the first subgroup ID, in order to ensure that the UE may monitor the paging, the PEI is not sent according to the first subgroup ID, but the PEI is directly broadcast according to the paging group.

When the PEI is broadcast according to the paging group, the PEI indicates whether all the UEs within the entire paging group need to monitor the corresponding PO; when the PEI is sent according to the first subgroup ID, it will further indicate, according to the paging sub-grouping, whether different UEs within the paging group need to monitor the corresponding PO.

For example, when the PEI is broadcast according to the paging group, a number of bits of the PEI may be 1, and two bit values of the bit may respectively indicate whether all the UEs within the entire paging group corresponding to the PO need to monitor the PO. When the PEI is broadcast according to the paging sub-grouping, the PEI is usually a plurality of bits, each of which indicates whether a UE in a different paging sub-grouping needs to monitor the corresponding PO. For example, the number of bits of PEI is 4 bits, and each bit of PEI may be used to indicate whether a UE in one paging sub-grouping needs to monitor the PO. For example, the bit value of PEI is "0010", then the UE in the $3^{rd}$ paging sub-grouping with the PEI needs to monitor the PO indicated by the PEI, and the remaining $1^{st}$, $2^{nd}$, and $4^{th}$ paging sub-groupings do not need to monitor the PO, thus reducing unnecessary PO monitoring of the UE.

When the UE supports the first subgroup ID, and the base station supports the first subgroup ID but does not broadcast the paging sub-grouping configuration information for determining the first subgroup ID, or the base station does not support the first subgroup ID, the base station will not send the PEI according to the paging sub-grouping based on the first subgroup ID, but will send the PEI according to the paging group.

In some embodiments, the first subgroup ID is determined using functional relationships of:

$$\text{UE\_ID} = TMSI \bmod M;$$

$$\text{Subgroup } ID' = \text{floor}(\text{UE\_ID}/(N * Ns)) \bmod N_{UEID}$$

$$\text{Subgroup } ID = \text{Subgroup } ID' + \text{offset};$$

where the Subgroup ID is the first subgroup ID; the TMSI is a temporary mobile subscriber identification number of the UE; the M is a modulo constant; the N is a number of paging frames; the Ns is a number of paging occasions in a paging frame; the $N_{UEID}$ is a sum of the sub-grouping number for the first subgroup ID and the sub-grouping number for the second subgroup ID; and the offset is an offset value.

Figure 6:
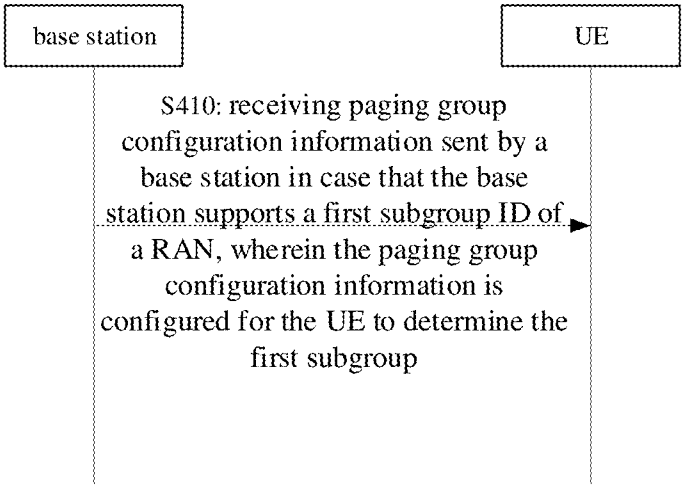
FIG. 6 is a flowchart illustrating a method for processing information according to an example embodiment.

As shown in FIG. 6, an embodiment of the present disclosure provides an method for processing information, which is executed by a UE. The method includes the following step.

At S410, paging sub-grouping configuration information is received from a base station in case that the base station supports a first subgroup ID of a RAN. The paging sub-grouping configuration information is configured for a UE to determine the first subgroup ID.

The method for processing information according to the embodiment of the present disclosure may be executed by a UE, and the UE may determine whether the base station supports the first subgroup ID according to the paging sub-grouping configuration information received from the base station.

For example, when the UE receives the paging sub-grouping configuration information, it may be considered that the base station supports the first subgroup ID, and the first subgroup ID may be determined according to the paging sub-grouping configuration information.

For another example, when the UE does not receive the paging sub-grouping configuration information from the base station in case that the base station supports the first subgroup ID of the RAN, the UE may determine that the base station does not support the first subgroup ID, and the UE may monitor the PEI according to the paging group rather than the paging sub-grouping identified by the first subgroup ID.

The paging sub-grouping configuration information implicitly indicates whether the base station supports the first subgroup ID, so the UE may determine whether the base station supports the first subgroup ID according to a reception state of the paging sub-grouping configuration information.

In some embodiments, the paging sub-grouping configuration information includes: a value range of the first subgroup ID; or a sub-grouping number for the first subgroup ID and an offset value for the first subgroup ID; or an offset value, in which the offset value is determined according to a sub-grouping number for a second subgroup ID from a CN.

When the UE receives the paging sub-grouping configuration information, on the one hand, it may be considered that the base station supports the first subgroup ID, and on the other hand, it may determine its own first subgroup ID according to the paging sub-grouping configuration information.

The paging sub-grouping configuration information may be various configuration information for each UE to determine its own first subgroup ID. In the embodiments of the present disclosure, three examples of the paging sub-grouping configuration information are provided, but the specific implementation is not limited to the above examples.

In some embodiments, the method further comprises: in response to receiving the second subgroup ID from the CN, monitoring the PEI according to the second subgroup ID.

In some embodiments, the method further comprises: in response to not receiving the second subgroup ID from the CN, receiving the paging sub-grouping configuration information and the UE supporting the first subgroup ID, monitoring the PEI according to the first subgroup ID.

When the UE does not receive the second subgroup ID from the CN, the UE monitors the PEI according to the first subgroup ID, as well as whether the UE itself supports the first subgroup ID and whether the base station broadcasts the paging sub-grouping configuration information for determining the first subgroup ID. As such, the UE only needs to monitor the PEI corresponding to the first subgroup ID.

In some embodiments, the method further comprises: in response to determining according to the paging sub-grouping configuration information that the base station supports the second subgroup ID from the CN and in response to receiving the second subgroup ID, monitoring the PEI according to the second subgroup ID When the UE receives the second subgroup ID, the UE may preferentially monitor the PEI according to the second subgroup ID. In this way, preferentially monitoring the PEI according to the second subgroup ID may cause the CN to preferentially configure a subgroup of the paging group of the UE.

In some embodiments, the paging sub-grouping configuration information includes: an indication bit, indicating whether the base station supports the second subgroup ID from the CN.

In some embodiments, the paging sub-grouping information directly includes an explicit indication that the base station supports the second subgroup ID from the CN.

In some embodiments, the method further comprises:

in case that an offset value included in the paging configuration information is not an extreme value of a sum of the sub-grouping number for the first subgroup ID and the sub-grouping number for the second subgroup ID, determining that the base station supports the second subgroup ID from the CN; or in case that an offset value included in the paging configuration information is equal to an extreme value of a sum of the sub-grouping number for the first subgroup ID and the sub-grouping number for the second subgroup ID, determining that the base station does not support the second subgroup ID from the CN.

In some embodiments, the UE may determine whether the base station supports the second subgroup ID according to the offset value of the paging sub-grouping configuration information.

The extreme value here includes a maximum value and/or a minimum value. For example, when the offset value for the first subgroup ID is equal to 0, it means that the second subgroup ID has no available value range, which means that the base station does not support the second subgroup ID.

In some embodiments, the method further comprises:

in case that a sub-grouping number for the first subgroup ID is equal to a sum of the sub-grouping number for the first subgroup ID and the sub-grouping number for the second subgroup ID, determining that the base station does not support the second subgroup ID; or in case that a sub-grouping number for the first subgroup ID is less than a sum of the sub-grouping number for the first subgroup ID and the sub-grouping number for the second subgroup ID, determining that the base station supports the second subgroup ID.

In some embodiments, the sub-grouping number for the first subgroup ID may also be used by the UE to determine whether the base station supports the second subgroup ID from the CN. For example, when the sub-grouping number for the first subgroup ID is equal to the sum of the sub-grouping number for the first subgroup ID and the sub-grouping number for the second subgroup ID, it means that the base station allocates all subgroup IDs to the first subgroup ID, that is, the base station does not support the second subgroup ID.

When the sub-grouping number for the first subgroup ID is less than the sum of the sub-grouping number for the first subgroup ID and the sub-grouping number for the second subgroup ID, it means that the base station reserved the sub-grouping number for the second subgroup ID when configuring the sub-grouping number for the first subgroup ID, and therefore it also means that the base station supports the second subgroup ID.

In some embodiments, the first subgroup ID is determined using functional relationships of:

$$\text{UE\_ID} = TMSI \bmod M;$$

$$\text{Subgroup } ID' = \text{floor}(\text{UE\_ID}/(N * Ns)) \bmod N_{UEID}$$

$$\text{Subgroup } ID = \text{Subgroup } ID' + \text{offset};$$

where the Subgroup ID is the first subgroup ID; the TMSI is a temporary mobile subscriber identification number of the UE; the M is a modulo constant; the N is a number of paging frames; the Ns is a number of paging occasions in a paging frame; the $N_{UEID}$ is a sum of the sub-grouping number for the first subgroup ID and the sub-grouping number for the second subgroup ID; and the offset is an offset value.

In summary, the UE may implicitly or explicitly know whether the base station supports the second subgroup ID according to the paging sub-grouping configuration information.

For a paging sub-grouping, the network side needs to provide a subgroup ID to the UE, and the UE monitors the paging sub-grouping corresponding to the subgroup ID.

In one way, the CN side directly provides a subgroup ID for a UE. In the other way, the base station side (gNB) provides paging sub-grouping configuration information for a UE, so that the UE calculates the subgroup ID.

When the CN directly provides the subgroup ID for the UE, the UE does not need to calculate the subgroup ID, during a registration process, receives instead a subgroup ID through a non access stratum (NAS) signaling sent by the CN. When the UE is in RRC_IDLFINACTIVE, it uses the subgroup ID to monitor the paging PEI or PO. For example, when the current subgroup ID=3, if the UE receives the paging PEI or PO, the UE will receive a paging message only when it receives an indication in an information bit corresponding to ID=3 (such as a bit value of three bits of the PEI is 001), otherwise the UE will not receive the paging message.

For a situation where the base station provides paging sub-grouping configuration information, the UE calculates a subgroup ID in an agreed formula based on the paging sub-grouping configuration information broadcast by the base station and its own UE identifier (UE-ID), and monitors the paging according to the subgroup ID.

In the present disclosure, both the first subgroup ID and the second subgroup ID identify paging sub-groupings. The sub-grouping may also be called a paging subgroup or a subgroup. One PO corresponds to one paging group, and one paging group is further divided into the aforementioned paging subgroups.

It is worth noting that the above two solutions may implement the paging sub-grouping mechanism, but when the two solutions are used in the network at the same time, it is necessary to consider alignment between the UE side and the network side, that is, which solution to use for paging monitoring.

when the base station supports the UE-ID sub-grouping solution, UE-ID paging sub-grouping configuration information is broadcast in a system message, otherwise it is not broadcast.

The UE-ID is a type of first subgroup ID.

In an embodiment, when the base station supports the UE-ID sub-grouping solution, the UE-ID paging sub-grouping configuration information is broadcast in an implicit manner through a system message SIBx (suitably SIB1, but not limited to the existing SIB).

This method allows the gNB to implicitly indicate whether it supports the UE-ID paging sub-grouping solution. That is, broadcasting means the gNB supports the UE-ID paging sub-grouping solution, and non-broadcasting means the gNB does not support the UE-ID paging sub-grouping solution. Furthermore, the UE-ID paging sub-grouping solution can also be interpreted as a sub-grouping solution at gNB side.

In some embodiments, the base station may use a 1-bit explicit indication in a system message to indicate whether the current base station additionally supports a sub-grouping mode of CN subgroups.

when a value of this 1-bit is 1, and the base station broadcasts the UE-ID paging sub-grouping configuration information, it means that the current base station supports a subgroup ID (i.e., UE-ID) of the RAN and also supports an ID of the CN, i.e., supports CN-ID.

In some embodiments, even if the current base station broadcasts the UE-ID paging sub-grouping configuration information, the base station may also use the 1-bit explicit indication in the system message to indicate whether the current base station supports the CN sub-grouping mode.

The UE-ID paging sub-grouping configuration information includes: a sub-grouping range of UE-ID. For example, the base station broadcasts the sub-grouping range of the UE-ID solution through the SIBx, such as subgroup ID being 4 to 7.

The total sub-grouping number of UE-ID and the offset value are configured by the base station. For example, the total sub-grouping number $N_{UEID}$ and the offset value in the UE-ID solution are broadcast by the base station through the SIBx. For example, the offset value is used to modify the calculated subgroup ID so that it does not overlap with the sub-grouping number occupied by the CN. At this time, the UE and the base station may calculate the subgroup ID according to the following possible agreed formula.

$$\text{Subgroup } ID' = \text{floor}(\text{UE\_ID}/(N * Ns)) \bmod N_{UEID}$$

$$\text{Subgroup } ID = \text{Subgroup } ID' + \text{offset}$$

N represents a number of paging frames provided by the current base station broadcasting, Ns represents a number of POs within each paging frame provided by the current base station, and the UE may calculate the subgroup ID in combination with its own UE-ID. $N_{UEID}$ represents the total sub-grouping number of UE-ID, that is, the total sub-grouping number of the aforementioned first subgroup ID. The function 'floor' represents rounding down.

UE_ID is calculated using the following function relationships:

TMSI mod M.

For example, 5G-S-TMSI mod 1024.

It may be understood that assuming the total subgroup ID ranges from 0 to 7, the CN subgroup occupies IDs from 0 to 3 in the front, and the UE-ID group occupies IDs from 4 to 7 in the back. This example is implemented by $N_{EUID}$=4 and offset=4.

It is not necessary to provide the offset value. when the offset value is not provided, there are two processing methods. In the first method, the terminal processes the offset value according to a protocol default value, such as offset=0. At this time, the base station does not support the CN subgroup, that is, does not support the aforementioned second subgroup ID.

In the second method, the terminal processes the offset value according to another protocol default value, such as offset=N, where N is a total number allocated to the CN-based paging sub-grouping solution, and N may be obtained from the CN or configured by the base station.

In an embodiment, the base station only needs to broadcast the offset value, and does not need to broadcast the total sub-grouping number $N_{EUID}$ of the UE-ID solution. Offset refers to a total number of subgroups allocated to the CN-based paging grouping solution broadcast by the base station for the terminal. At this time, $N_{EUID}$ is equal to the total sub-grouping number supported by the base station minus offset. Assuming that the current total sub-grouping number is 8, the base station can implicitly indicate that the current base station does not provide CN grouping, that is, does not support the CN grouping solution, in this way of offset=0. Of course, when $N_{EUID}$=8 and the UE-ID of the RAN occupies all the sub-groupings, it indicates offset=0, which may also be used to perform the above implicit indication.

When the base station supports the UE-ID sub-grouping solution and broadcasts the UE-ID paging sub-grouping configuration information through the system message, it is implied that the base station supports both the CN-based paging sub-grouping solution and the UE-ID-based sub-grouping solution.

As long as the base station broadcasts the configuration information of PEI, it means that the base station implicitly supports the CN-based paging sub-grouping solution. On this basis, combined with the paging sub-grouping configuration information, it further indicates whether the base station supports the UE-ID solution.

The gNB determines which solution is used to page the UE based on whether the subgroup ID is received from the CN.

When the gNB receives a paging message from the CN that carries a subgroup ID, the CN sub-grouping solution is used, that is, the subgroup ID is directly used to page the UE.

Furthermore, the subgroup ID may be used to indicate PEI transmission, and may also be used to indicate PO transmission, such as ID=0, indicating that the first bit corresponding to PEI is set to 1 for transmission. That is, the CN allocates the CN subgroup ID, which means that the terminal must have the paging sub-grouping capability.

The gNB receives the subgroup ID from the CN. The subgroup ID from the CN may be sent, for example, via N2 signaling. The N2 signaling here includes but is not limited to: an initial context setup response and a UE context modification request.

When the UE is in an inactive state (RRC_INACTIVE), and the CN sends data or signaling to the UE, the base station will page the UE using the CN sub-grouping solution, that is, directly using the subgroup ID to page the UE.

Furthermore, the subgroup ID may be used to indicate PEI transmission, and can also be used to indicate PO transmission, such as ID=0, the first bit of the group corresponding to indicating PEI is set to 1 for transmission. That is, when the CN has allocated it, it means that the terminal must have the paging packet capability.

For the situation where the gNB does not receive the subgroup ID from the CN, when the CN sends a paging message without carrying the subgroup ID to the gNB, or the CN sends data/signaling to the gNB, the gNB decides whether to page the UE using the UE-ID sub-grouping solution, based on the UE capability and whether the UE-ID paging sub-grouping configuration information is currently broadcast. When both sides support it, the UE-ID sub-paging solution is used, otherwise it is not used.

That is, the subgroup ID assigned by the CN has a higher priority than the subgroup ID calculated by the gNB. That is, when the CN subgroup ID exists, the base station ignores the broadcast UE-ID paging sub-grouping configuration information.

The UE monitors PEI of the corresponding paging subgroup according to the paging subgroup ID sent by the CN, thereby reducing unnecessary paging monitoring.

For example, when the UE receives a subgroup ID from the CN during the registration process, the UE directly uses the subgroup ID to monitor a paging regardless of whether the current gNB broadcasts the UE-ID paging sub-grouping configuration information. The subgroup ID received from the CN is the aforementioned second subgroup ID.

Furthermore, the subgroup ID may be used to indicate whether the PEI or PO received by the UE has a paging indication, such as ID=0, which indicates there is a paging when the first bit of the subgroup for the received PEI or PO is 1.

For another example, even if the UE has a CN subgroup ID, it still needs to use the "1-bit" broadcast by the gNB in the system message to indicate CN sub-grouping capability and determine whether to use the CN sub-grouping method. When the base station indicates that CN sub-grouping is not currently supported, the UE ignores the CN subgroup ID it has and uses the UE-ID paging sub-grouping configuration broadcast in the system message to calculate the subgroup ID.

For another example, even if the UE has a CN subgroup ID, when N and offset of the current base station implicitly indicate that a space for the CN subgroup ID is currently not reserved for the sub-grouping (such as offset=0; N=8), the UE will ignore the CN subgroup ID it has and use the UE-ID paging group configuration broadcast in the system message to calculate the subgroup ID. The CN subgroup ID is the aforementioned second subgroup ID.

When the UE does not receive the subgroup ID from the CN, it monitors the corresponding paging subgroup according to the UE-ID paging sub-grouping configuration information broadcast by the base station.

When the UE does not receive the subgroup ID from the CN, the UE decides whether to use the UE-ID paging sub-grouping solution based on its own UE-ID paging sub-grouping capability and whether the gNB broadcasts the UE-ID paging sub-grouping configuration information. When both are supported, the UE calculates a subgroup ID based on the UE-ID formula, and uses the subgroup ID to monitor a paging.

Furthermore, the subgroup ID may be used to indicate whether the PEI or PO received by the UE has a paging indication, such as ID=0, which indicates there is a paging when the first bit of the subgroup for the received PEI or PO is 1.

When the UE does not receive the subgroup ID from the CN, and one of the UE and the gNB does not support the UE-ID paging sub-grouping solution, the paging sub-grouping technology is not used. The subgroup ID received from the CN is the aforementioned second subgroup ID.

That is, the subgroup ID assigned by the CN has a higher priority than the subgroup ID of the gNB. That is, a priority of the second subgroup ID is higher than a priority of the first subgroup ID.

Figure 7:
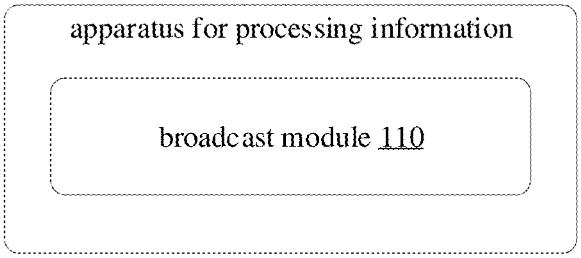
FIG. 7 is a structure diagram illustrating an apparatus for processing information according to an example embodiment.

As shown in FIG. 7, an embodiment of the present disclosure provides an apparatus for processing information. The apparatus includes a broadcast module 110.

The broadcast module 110 is configured to in case that the base station supports a first subgroup ID of a RAN, broadcast paging sub-grouping configuration information. The paging sub-grouping configuration information is configured for a UE to determine the first subgroup ID.

The apparatus for processing information may be included in a base station.

In some embodiments, the broadcast module 110 may be a program module, which can implement a broadcast of paging sub-grouping configuration information after being executed by a processor.

In other embodiments, the broadcast module 110 may also be a software-hardware combination module, which includes but is not limited to various programmable arrays. The programmable array includes but is not limited to: a field programmable array and/or a complex programmable array.

In some other embodiments, the broadcast module 110 may also be a pure hardware module, which includes but is not limited to: a dedicated integrated circuit.

In some embodiments, the broadcast module 110 is further configured to not broadcast the paging sub-grouping configuration information when the base station does not support the first subgroup ID.

In some embodiments, the paging sub-grouping configuration information includes: a value range of the first subgroup ID, or a sub-grouping number for the first subgroup ID and an offset value for the first subgroup ID, or an offset value, in which the offset value is determined according to a sub-grouping number for a second subgroup ID from a CN.

In some embodiments, in case that the base station does not support the second subgroup ID, the offset value is an extreme value of a sum of the sub-grouping number for the first subgroup ID and the sub-grouping number for the second subgroup ID; and/or in case that the base station supports the second subgroup ID, the offset value is not an extreme value of a sum of the sub-grouping number for the first subgroup ID and the sub-grouping number for the second subgroup ID; and/or in case that the base station does not support the second subgroup ID, the sub-grouping number for the first subgroup ID is equal to a sum of the sub-grouping number for the first subgroup ID and the sub-grouping number for the second subgroup ID; and/or in case that the base station supports the second subgroup ID, the sub-grouping number for the first subgroup ID is less than a sum of the sub-grouping number for the first subgroup ID and the sub-grouping number for the second subgroup ID.

In some embodiments, the paging sub-grouping configuration information further includes: an indication bit, indicating whether the base station supports the second subgroup ID from the CN.

In some embodiments, the broadcast module 110 is configured to broadcast the paging sub-grouping configuration information in case that the base station supports the second subgroup ID from the CN and the first subgroup ID of the RAN.

In some embodiments, the broadcast module 110 is further configured to broadcast sub-grouping configuration information of a PEI in case that the base station supports the second subgroup ID from the CN.

In some embodiments, the apparatus further comprises: a sending module, configured to send the PEI according to the second subgroup ID in response to receiving the second subgroup ID sent by the CN.

In some embodiments, the sending module is configured to in response to not receiving the second subgroup ID from the CN, determine, according to whether the UE supports a subgroup ID and whether the base station broadcasts the paging sub-grouping configuration information, whether to send the PEI according to the first subgroup ID.

In some embodiments, the sending module is configured to send the PEI according to the first subgroup ID in case that the UE supports the first subgroup ID and the base station broadcasts the paging sub-grouping configuration information; or not send the PEI according to the first subgroup ID in case that the UE does not support the first subgroup ID; or not send the PEI according to the first subgroup ID in case that the base station does not broadcast the paging sub-grouping configuration information.

In some embodiments, the first subgroup ID is determined using function relationships of:

$$\text{UE\_ID} = TMSI \bmod M;$$

$$\text{Subgroup } ID' = \text{floor}(\text{UE\_ID}/(N * Ns)) \bmod N_{UEID}$$

$$\text{Subgroup } ID = \text{Subgroup } ID' + \text{offset};$$

where the Subgroup ID is the first subgroup ID; the TMSI is a temporary mobile subscriber identification number of the UE; the M is a modulo constant; the N is a number of paging frames; the Ns is a number of paging occasions in a paging frame; the $N_{UEID}$ is a sum of the sub-grouping number for the first subgroup ID and the sub-grouping number for the second subgroup ID; and the offset is an offset value.

Figure 8:
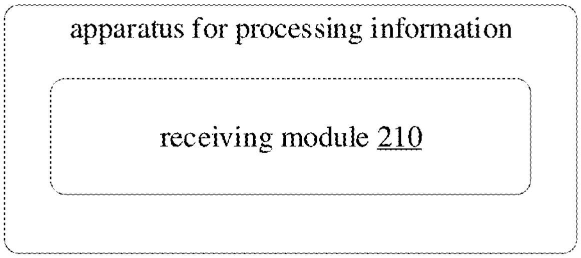
FIG. 8 is a structure diagram illustrating an apparatus for processing information according to an example embodiment.

As shown in FIG. 8, an embodiment of the present disclosure provides an apparatus for processing information. The apparatus includes a receiving module 210.

The receiving module 210 is configured to receive paging sub-grouping configuration information sent by a base station in case that the base station supports a first subgroup ID of a RAN. The paging sub-grouping configuration information is configured for the UE to determine the first subgroup ID.

The apparatus for processing information may be included in a UE.

In some embodiments, the receiving module 210 may be a program module, which can implement a reception of paging sub-grouping configuration information after being executed by a processor.

In some embodiments, the receiving module 210 may also be a software-hardware combination module, which includes but is not limited to various programmable arrays. The programmable array includes but is not limited to: a field programmable array and/or a complex programmable array.

In some other embodiments, the receiving module 210 may be a pure hardware module; the pure hardware module includes but is not limited to various application-specific integrated circuits.

In some embodiments, the paging sub-grouping configuration information includes: a value range of the first subgroup ID, or a sub-grouping number for the first subgroup ID and an offset value for the first subgroup ID, or an offset value, in which the offset value is determined according to a sub-grouping number for a second subgroup ID from a CN.

When the first subgroup ID of the CN is received, the PEI is monitored according to the first subgroup ID.

In some embodiments, the apparatus further comprises a monitoring module, configured to monitor the PEI according to the first subgroup ID, in response to not receiving the second subgroup ID from the CN, receiving the paging sub-grouping configuration information and the UE supporting the first subgroup ID.

In some embodiments, the monitoring module is configured to in response to determining according to the paging sub-grouping configuration information that the base station supports the second subgroup ID from the CN and in response to receiving the second subgroup ID, monitor the PEI according to the second subgroup ID.

In some embodiments, the paging sub-grouping configuration information includes: an indication bit, indicating whether the base station supports the second subgroup ID from the CN.

In some embodiments, the apparatus further comprises a first determination module, configured to: in case that an offset value comprised in the paging configuration information is not an extreme value of a sum of the sub-grouping number for the first subgroup ID and the sub-grouping number for the second subgroup ID, determine that the base station supports the second subgroup ID from the CN; or in case that an offset value comprised in the paging configuration information is equal to an extreme value of a sum of the sub-grouping number for the first subgroup ID and the sub-grouping number for the second subgroup ID, determine that the base station does not support the second subgroup ID from the CN.

In some embodiments, the apparatus further comprises a second determination module, configured to: in case that a sub-grouping number for the first subgroup ID is equal to a sum of the sub-grouping number for the first subgroup ID and the sub-grouping number for the second subgroup ID, determine that the base station does not support the second subgroup ID; or in case that a sub-grouping number for the first subgroup ID is less than a sum of the sub-grouping number for the first subgroup ID and the sub-grouping number for the second subgroup ID, determine that the base station supports the second subgroup ID.

In some embodiments, the first subgroup ID is determined using function relationships of:

$$\text{UE\_ID} = TMSI \bmod M;$$

$$\text{Subgroup } ID' = \text{floor}(\text{UE\_ID}/(N * Ns)) \bmod N_{UEID}$$

$$\text{Subgroup } ID = \text{Subgroup } ID' + \text{offset};$$

where the Subgroup ID is the first subgroup ID; the TMSI is a temporary mobile subscriber identification number of the UE; the M is a modulo constant; the N is a number of paging frames; the Ns is a number of paging occasions in a paging frame; the $N_{UEID}$ is a sum of the sub-grouping number for the first subgroup ID and the sub-grouping number for the second subgroup ID; and the offset is an offset value.

The present disclosure provides a communication device, including: a processor and a memory for storing instructions executable by the processor. The processor is connected to the memory. The processor is configured to execute the control method and/or method for processing information according to any of the aforementioned technical solutions at the terminal side.

The processor may include various types of storage media, which are non-transitory computer storage media that can continue to memory information stored thereon after the communication device powers off.

Here, the communication device includes: an access device or a UE or a base station.

The processor may be connected to the memory via a bus or the like, and is used to read an executable program stored in the memory, for example, and perform at least one of the methods shown in FIG. 3 to FIG. 6.

Figure 9:
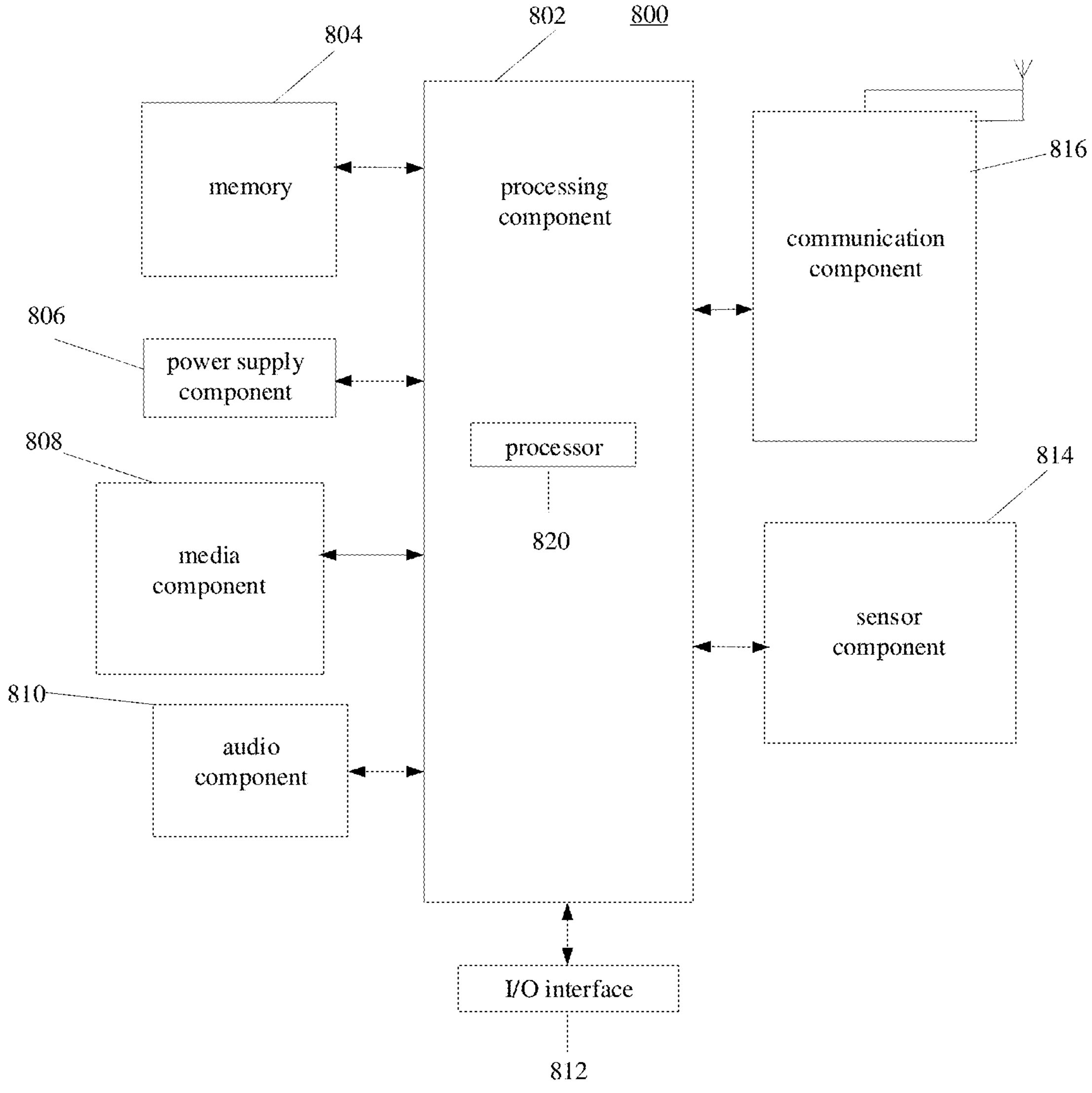
FIG. 9 is a structure diagram illustrating a UE according to an example embodiment.

FIG. 9 is a block diagram illustrating a UE 800 according to an example embodiment. The UE 800 may be a mobile phone, a computer, a digital broadcasting terminal, a messaging device, a game console, a tablet device, a medical equipment, a fitness equipment, a personal digital assistant, etc.

As illustrated in FIG. 9, the UE 800 may include one or more of a processing component 802, a memory 804, a power supply component 806, a multimedia component 808, an audio component 810, an input/output (I/O) interface 812, a sensor component 814, or a communication component 816.

The processing component 802 generally controls the whole operation of the UE 800, such as operations related to display, phone call, data communication, camera operation and recording operation. The processing component 802 may include one or more processors 820 to perform instructions, to complete all or part of steps of the above method. In addition, the processing component 802 may include one or more modules for the convenience of interactions between the processing component 802 and other components. For example, the processing unit 802 may include a multimedia module for the convenience of interactions between the multimedia component 808 and the processing component 802.

The memory 804 is configured to store all types of data to support an operation of the UE 800. Examples of the data include the instructions of any application programs or methods operated on the UE 800, contact data, phone book data, messages, pictures, videos, etc. The memory 804 may be implemented by any type of volatile or non-volatile storage devices or their combination, such as a static random access memory (SRAM), an electrically erasable programmable read-only memory (EEPROM), an erasable programmable read-only (EPROM), a programmable read-only memory (PROM), a read-only memory (ROM), a magnetic memory, a flash memory, a magnetic disk or an optical disk.

The power supply component 806 may provide power powers for each component of the UE 800. The power supply component 806 may include a power supply management system, one or more power supplies, and other units related to generating, managing and distributing powers for the UE 800.

The multimedia component 808 includes an output interface screen provided between the UE 800 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense a touch action, a slide action and a gesture on the touch panel. The touch sensor may not only sense a boundary of the touch or slide action, but also detect a duration and pressure related to the touch or slide action. In some embodiments, the multimedia component 808 includes a front camera and/or a rear camera. When the UE 800 is in an operation mode, such as a shooting mode or a video mode, the front camera and/or the rear camera may receive external multimedia data. Every of the front camera and the rear camera may be a fixed optical lens system or an optical lens system with a focal length and an optical zoom capacity.

The audio component 810 is configured as an output and/or input signal. For example, the audio component 810 includes a microphone (MIC). When the UE 800 is in an operation mode, such as a call mode, a record mode, and a speech recognition mode, the microphone is configured to receive the external audio signals. The audio signals received may be further stored in the memory 804 or sent via the communication component 816. In some embodiments, the audio component 810 further includes a speaker configured to output an audio signal.

The I/O interface 812 provides an interface for the processing component 802 and a peripheral interface module, and the peripheral interface module may be a keyboard, a click wheel, a button, etc. The buttons may include but not limited to a home button, a volume button, a start button and a lock button.

The sensor component 814 includes one or more sensors, configured to provide various aspects of status assessment for the UE 800. For example, the sensor component 814 may detect an on/off state of the UE 800 and a relative positioning of the component. For example, the component is a display and a keypad of the UE 800. The sensor component 814 may further detect a location change of the UE 800 or one component of the UE 800, a presence or absence of a contact between a user and the UE 800, an orientation or an acceleration/deceleration of the UE 800, and a temperature change of the UE 800. The sensor component 814 may include a proximity sensor, which is configured to detect the existence of the objects nearby without any physical contact. The sensor component 814 may further include a light sensor such as a CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of a wire or wireless communication between the UE 800 and other devices. The UE 800 may access wireless networks based on a communication standard, such as WiFi, 2G or 3G, or their combination. In an example embodiment, the communication component 816 receives broadcast signals or broadcast-related information from an external broadcast management system via a broadcast channel. In an example embodiment, the communication component 816 further includes a near field communication (NFC) module to facilitate a short-range communication. For example, the NFC module may be implemented based on a radio frequency identification (RFID) technology, an infrared data association (IRDA) technology, an ultra-wideband (UWB) technology, Bluetooth (BT) technology and other technologies.

In an example embodiment, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, a non-transitory computer-readable storage medium including instructions is also provided. After the computer-readable program stored on the computer storage medium is executed by a processor, the method for processing information according to any one of the above-mentioned technical solutions can be implemented, for example, the method for processing information shown in any one of FIG. 3 to FIG. 6. For example, the computer program may be stored in the memory 804, and the computer program may be executed by the processor 820 of the UE 800 to complete the above method. For example, the non-transitory computer-readable storage medium may be a ROM, a random access memory (RAM), a CD-ROM, a magnetic tape, a floppy disk, an optical data storage device, and the like.

Figure 10:
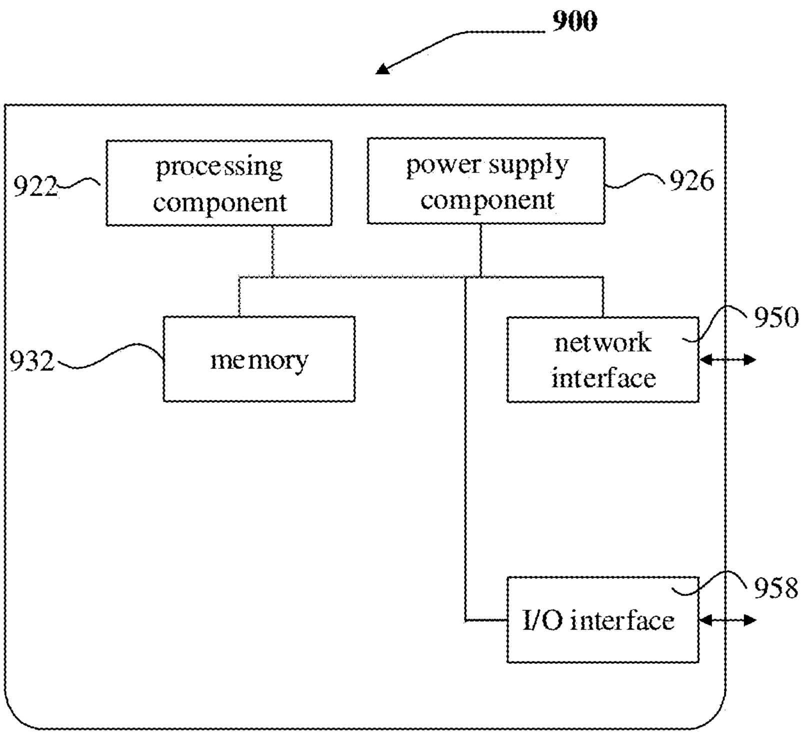
FIG. 10 is a structure diagram illustrating a communication device according to an example embodiment.

As shown in FIG. 10, an embodiment of the present disclosure shows a structure of an access device. For example, the communication device 900 may be provided as a network side device. The communication device may be the aforementioned access device. The access network device includes but is not limited to a base station.

Referring to FIG. 10, the device 900 includes a processing component 922, which further includes one or more processors, and memory resources represented by a memory 932, which are configured to store instructions executable by the processing component 922, for example, an application program. The application program stored in the memory 932 may include one or more modules, each of which corresponds to a set of instructions. In addition, the processing component 922 is configured to execute instructions, to perform the above method applied to the access device, such as the method shown in any one of FIG. 3 to FIG. 6.

The communication device 900 may further include a power supply component 926 configured to execute power management of the communication device 900, and a wired or wireless network interface 950 configured to connect the communication device 900 to a network, and an I/O interface 958. The communication device 900 may be operated in an operating system stored in the memory 932, for example, Windows Server™, Mac OS X™, Unix™, Linux™, and FreeBSD™.

After considering the specification and practicing the disclosure here, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. It is intended that the specification and examples be considered as exemplary only, with a true scope of the invention being indicated by the following claims.

It should be understood that the present invention is not limited to the specific structures that have been described above and shown in the drawings, and various modifications and changes may be made without departing from the scope thereof. The scope of the present invention is limited only by the attached claims.

What is claimed is:

1. A method for processing information, performed by a base station, the method comprising:

in case that the base station supports a first subgroup ID of a radio access network (RAN), broadcasting paging sub-grouping configuration information, wherein the paging sub-grouping configuration information is configured for a user equipment (UE) to determine the first subgroup ID, and wherein the paging sub-grouping configuration information comprises a total number of subgroups for the first subgroup ID;

wherein the first subgroup ID is determined by the base station according to a broadcasted total number of subgroups and an offset value, and according to the following formulas:

$$\text{Subgroup } ID' = \text{floor}(\text{UE\_ID}/(N*Ns))\text{mod}N_{UEID}; \text{ and}$$

$$\text{Subgroup } ID = \text{Subgroup } ID' + \text{offset};$$

wherein the Subgroup ID is the first subgroup ID, the N is the number of paging frames, the Ns is the number of paging occasions in a paging frame, the $N_{UEID}$ is the total number of subgroups for the first subgroup ID, and the offset is the offset value; and wherein the offset value is configured to be a total number of subgroups assigned to a second subgroup ID in a core network (CN) paging subgrouping based on a protocol agreement.

2. The method according to claim 1, further comprising: in case that the base station does not support the first subgroup ID, not broadcasting the paging sub-grouping configuration information.

3. The method according to claim 1, wherein the paging sub-grouping configuration information further comprises one of:

a value range of the first subgroup ID;

a sub-grouping number for the first subgroup ID and an offset value for the first subgroup ID; or an offset value, wherein the offset value is determined according to a sub-grouping number for a second subgroup ID from a core network (CN).

4. The method according to claim 3, further comprising at least one of:

in case that the base station does not support the second subgroup ID, the offset value being an extreme value of a sum of the sub-grouping number for the first subgroup ID and the sub-grouping number for the second subgroup ID;

in case that the base station supports the second subgroup ID, the offset value not being an extreme value of a sum of the sub-grouping number for the first subgroup ID and the sub-grouping number for the second subgroup ID;

in case that the base station does not support the second subgroup ID, the sub-grouping number for the first subgroup ID being equal to a sum of the sub-grouping number for the first subgroup ID and the sub-grouping number for the second subgroup ID; or in case that the base station supports the second subgroup ID, the sub-grouping number for the first subgroup ID being less than a sum of the sub-grouping number for the first subgroup ID and the sub-grouping number for the second subgroup ID.

5. The method according to claim 1, wherein the paging sub-grouping configuration information further comprises: an indication bit, indicating whether the base station supports the second subgroup ID from a core network (CN).

6. The method according to claim 1, wherein in case that the base station supports the first subgroup ID of the RAN, broadcasting the paging sub-grouping configuration information, comprises:

in case that the base station supports the second subgroup ID from a core network (CN) and the first subgroup ID of the RAN, broadcasting the paging sub-grouping configuration information.

7. The method according to claim 1, further comprising:

in case that the base station supports the second subgroup ID from a core network (CN), broadcasting sub-grouping configuration information of a paging early indication (PEI).

8. The method according to claim 1, further comprising: in response to receiving the second subgroup ID from a core network (CN), sending a paging early indication (PEI) according to the second subgroup ID.

9. The method according to claim 8, further comprising: in response to not receiving the second subgroup ID from the CN, determining, according to whether the UE supports the first subgroup ID and whether the base station broadcasts the paging sub-grouping configuration information, whether to send the PEI according to the first subgroup ID.

10. The method according to claim 9, wherein determining, according to whether the UE supports the first subgroup ID and whether the base station broadcasts the paging sub-grouping configuration information, whether to send the PEI according to the first subgroup ID comprises one of:

in case that the UE supports the first subgroup ID and the base station broadcasts the paging sub-grouping configuration information, sending the PEI according to the first subgroup ID;

in case that the UE does not support the first subgroup ID, not sending the PEI according to the first subgroup ID; or in case that the base station does not broadcast the paging sub-grouping configuration information, not sending the PEI according to the first subgroup ID.

11. The method according to claim 1, wherein the second subgroup ID is acquired by the base station from a core network (CN) via an initial context setup response or a UE context modification request.

12. A method for processing information, performed by a user equipment (UE), the method comprising:

receiving paging sub-grouping configuration information sent by a base station in case that the base station supports a first subgroup ID of a radio access network (RAN), wherein the paging sub-grouping configuration information is configured for the UE to determine the first subgroup ID, and wherein the paging sub-grouping configuration information comprises a total number of subgroups for the first subgroup ID;

wherein the first subgroup ID is determined by the base station according to a broadcasted total number of subgroups and an offset value, and according to the following formulas:

$$\text{Subgroup } ID' = \text{floor}(\text{UE\_ID}/(N * Ns))\text{mod}N_{UEID}\text{; and}$$

$$\text{Subgroup } ID = \text{Subgroup } ID' + \text{offset;}$$

wherein the Subgroup ID is the first subgroup ID, the N is the number of paging frames, the Ns is the number of paging occasions in a paging frame, the $N_{UEID}$ is the total number of subgroups for the first subgroup ID, and the offset is the offset value; and wherein the offset value is configured to be a total number of subgroups assigned to a second subgroup ID in a core network (CN) paging subgrouping based on a protocol agreement.

13. The method according to claim 12, wherein the paging sub-grouping configuration information further comprises one of:

a value range of the first subgroup ID;

a sub-grouping number for the first subgroup ID and an offset value for the first subgroup ID; or an offset value, wherein the offset value is determined according to a sub-grouping number for a second subgroup ID from a core network (CN).

14. The method according to claim 12, further comprising:

in response to not receiving the second subgroup ID from a core network (CN), receiving the paging sub-grouping configuration information and the UE supporting the first subgroup ID, monitoring a paging early indication (PEI) according to the first subgroup ID.

15. The method according to claim 12, further comprising:

in response to determining according to the paging sub-grouping configuration information that the base station supports the second subgroup ID from a core network (CN) and in response to receiving the second subgroup ID, monitoring a paging early indication (PEI) according to the second subgroup ID.

16. The method according to claim 15, wherein the paging sub-grouping configuration information comprises: an indication bit, indicating whether the base station supports the second subgroup ID from the CN.

17. The method according to claim 15, further comprising one of:

in case that an offset value comprised in the paging sub-grouping configuration information is not an extreme value of a sum of the sub-grouping number for the first subgroup ID and the sub-grouping number for the second subgroup ID, determining that the base station support the second subgroup ID from the CN; or in case that an offset value comprised in the paging sub-grouping configuration information is equal to an extreme value of a sum of the sub-grouping number for the first subgroup ID and the sub-grouping number for the second subgroup ID, determining that the base station does not support the second subgroup ID from the CN.

18. The method according to claim 15, further comprising one of:

in case that a sub-grouping number for the first subgroup ID is equal to a sum of the sub-grouping number for the first subgroup ID and the sub-grouping number for the second subgroup ID, determining that the base station does not support the second subgroup ID; or in case that a sub-grouping number for the first subgroup ID is less than a sum of the sub-grouping number for the first subgroup ID and the sub-grouping number for the second subgroup ID, determining that the base station supports the second subgroup ID.

19. A base station, comprising:

a processor;

a transceiver; and a memory storing a program executable by the processor, wherein the processor is configured to perform the method according to claim 12.

20. A user equipment (UE), comprising:

a processor;

a transceiver; and a memory storing a program executable by the processor, wherein the processor is configured to:

receive paging sub-grouping configuration information sent by a base station in case that the base station supports a first subgroup ID of a radio access network (RAN), wherein the paging sub-grouping configuration information is configured for the UE to determine the first subgroup ID, and wherein the paging sub-grouping configuration information comprises a total number of subgroups for the first subgroup ID;

wherein the first subgroup ID is determined by the base station according to a broadcasted total number of subgroups and an offset value, and according to the following formulas:

$$\text{Subgroup } ID' = \text{floor}(\text{UE\_ID}/(N * Ns))\text{mod}N_{UEID}; \text{ and}$$

$$\text{Subgroup } ID = \text{Subgroup } ID' + \text{offset};$$

wherein the Subgroup ID is the first subgroup ID, the N is the number of paging frames, the Ns is the number of paging occasions in a paging frame, the $N_{UEID}$ is the total number of subgroups for the first subgroup ID, and the offset is the offset value; and wherein the offset value is configured to be a total number of subgroups assigned to a second subgroup ID in a core network (CN) paging subgrouping based on a protocol agreement.

* * * * *